H. J. STOCKUM AND J. H. VAN SCIVER.
SIGNAL FOR AUTOMOBILES.
APPLICATION FILED MAR. 19, 1920.
1,404,905.
Patented Jan. 31, 1922.
3 SHEETS—SHEET 1.
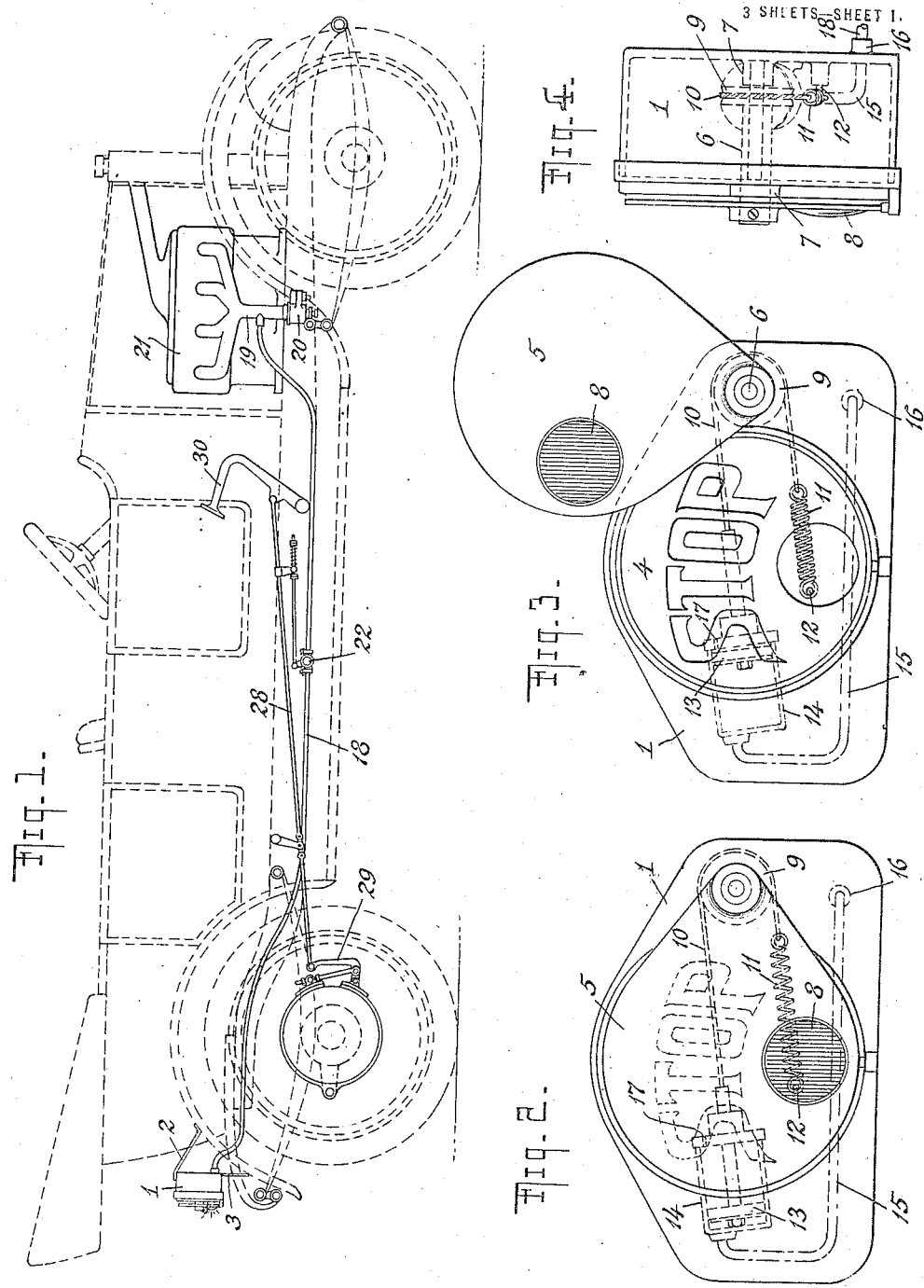
WITNESSES
INVENTORS
HARRY J. STOCKUM
J. HOWARD VAN SCIVER
BY
ATTORNEYS

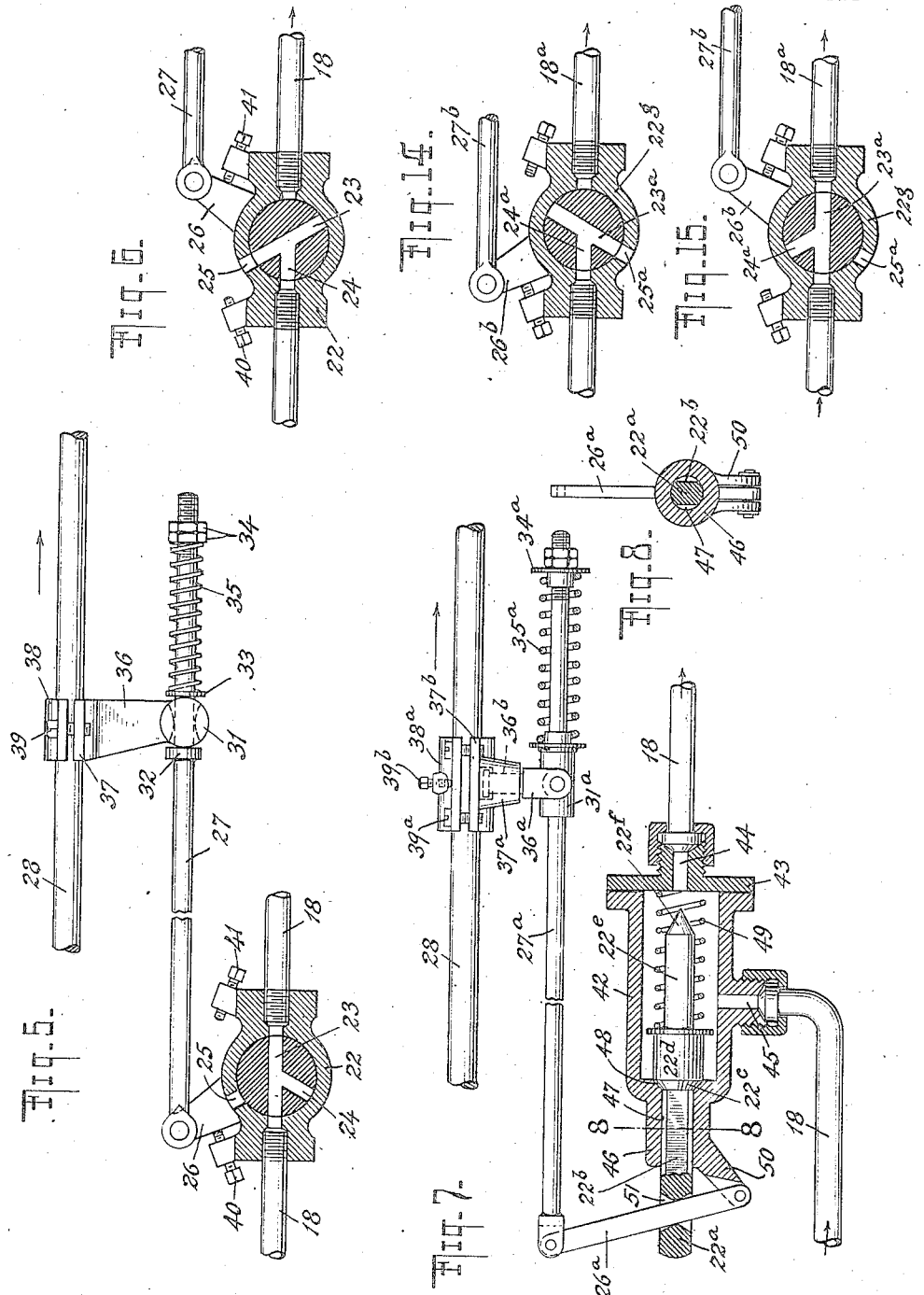

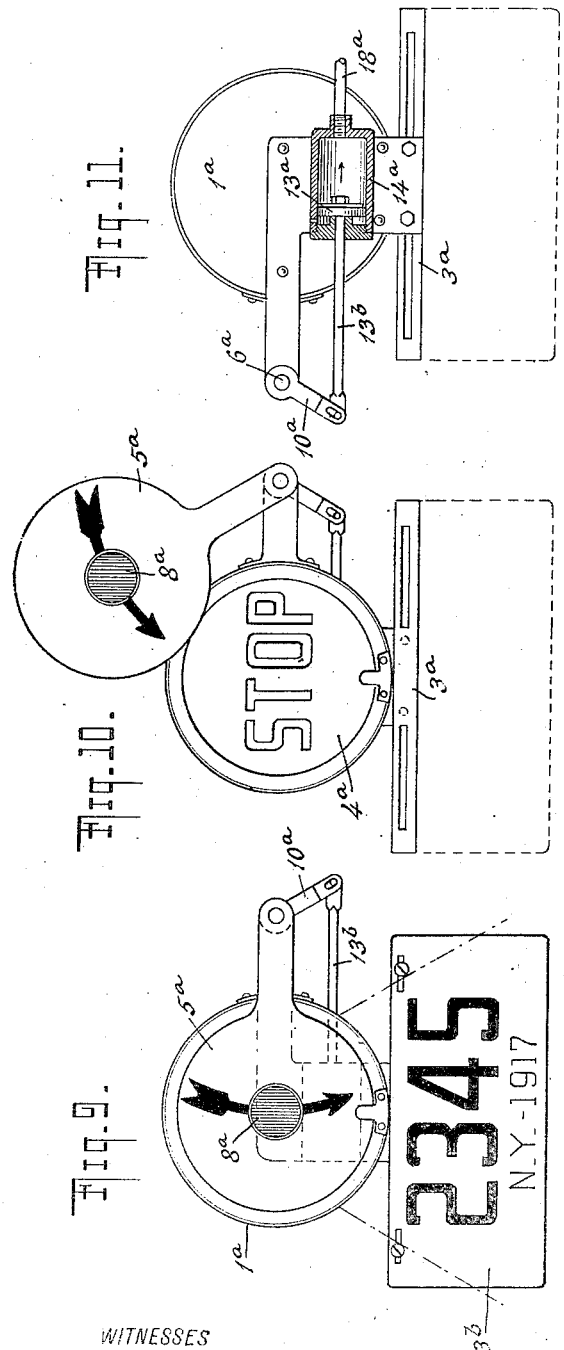

UNITED STATES PATENT OFFICE.

HARRY J. STOCKUM, OF DELAWARE TOWNSHIP, CAMDEN COUNTY, NEW JERSEY, AND JOSIAH HOWARD VAN SCIVER, OF PHILADELPHIA, PENNSYLVANIA, ASSIGNORS TO AUTOMOBILE APPLIANCES CO., OF PHILADELPHIA, PENNSYLVANIA, A CORPORATION OF PENNSYLVANIA.

SIGNAL FOR AUTOMOBILES.

1,404,905.  Specification of Letters Patent.  Patented Jan. 31, 1922.

Application filed March 19, 1920. Serial No. 367,049.

*To all whom it may concern:*

Be it known that we, HARRY J. STOCKUM and J. HOWARD VAN SCIVER, both citizens of the United States, and respectively residents of Delaware Township, Camden County, State of New Jersey, and the city of Philadelphia, county of Philadelphia, State of Pennsylvania, have invented certain new and useful Improvements in a Signal for Automobiles, of which the following is a specification.

In the operation of automobiles, particularly where traffic is congested, it is necessary to slow-up or stop at frequent and unexpected intervals, either because of prior slowing or stoppage ahead, or because it is desired to leave the main highway to right or left. In such cases it is usual for the driver to signal to vehicles behind him by raising and extending his arm outwardly from the vehicle. This kind of a signal is, however, not always seen, or even capable of being seen, and where the vehicle is closed, cannot even be made. Frequent and many signals of this kind, also, are wearisome. Such a signal, furthermore, is not readily observed at night, particularly when the illumination is poor.

For the above reasons, therefore, numerous plans have been proposed for showing a signal, for instance at the rear of the vehicle. Some of these plans provide for an illuminated signal at night, and others contemplate a signal manually operated from the driver's seat by means of wires, cables, or links extending to the rear of the vehicle, while still other plans contemplate the operation of signals by electricity through the operation of a suitable switch, also at the driver's seat. The object of our invention about to be described is to provide a signal mounted preferably upon the rear of a vehicle and adapted to be displayed positively, plainly, and automatically whenever the vehicle is slowed or stopped, whether in the day time or at night, and without conscious attention on the part of the driver.

A further object of our invention is to provide a signal of the character specified which may be combined with the usual tail light in such a way as to have certain elements in common, thereby lessening the total number of parts required and the corresponding cost of construction. A still further object of our invention is to provide a signal of the character specified which can be readily and simply attached to an automobile of usual construction with practically no alteration or mutilation of parts.

Yet another object of our invention is to provide a special valve movement for the operation of our improved signal whereby certain disadvantages likely to be met with in valves of usual construction will be eliminated.

Our invention will be fully described hereinafter and the features of novelty will be pointed out in the appended claims.

Our invention will be better understood by referring to the accompanying drawing in which Fig. 1 illustrates our invention in one form applied to a touring car of usual construction, non-essential parts of the car being shown dotted; Fig. 2 is an enlarged view, taken from the rear, of the specific embodiment of signal used in Fig. 1, the signal being in "off" position; Fig. 3 is a view, similar to Fig. 2, the signal being in "on" position; Fig. 4 is a side elevation of Fig. 2, looking from the right; Fig. 5 is an enlarged detail view, partly in section, illustrating the controlling valve of Fig. 1, and its connections; Fig. 6 is a detail section of said valve in a different position; Fig. 7 is a detail view, similar to Fig. 5, illustrating an improved valve which may be used as a substitute for the valve of Figs. 5 and 6; Fig. 8 is a detail section on the line 8—8 of Fig. 7; Figs. 9 and 10 are views corresponding to Figs. 2 and 3 but illustrating our invention in a different form; Fig. 11 is a rear view of Fig. 9, partly in section; Fig. 12 is a side elevation of Fig. 9 looking from the right; Fig. 13 is a sectional view showing the valve of Fig. 7 adapted for the form of our invention illustrated in Figs. 9 to 12 inclusive; Fig. 14 is a sectional view of the valve of Fig. 5 adapted for this latter form of our invention and Fig. 15 is a sectional view illustrating the valve of Fig. 14 in a different position.

As shown in Figs. 1 to 4 inclusive the signal lamp comprises a casing 1 of any suitable construction and shape and arranged to be mounted upon a convenient part of the automobile, preferably at the rear, for instance, by means of brackets 2 and 3. The casing 1 is provided with a glass front 4 upon which the word "Stop" is produced in any convenient manner so as to contrast with the front itself. An obscuring disk 5 of suitable form and dimensions to obscure the glass front 4, is rigidly mounted, exteriorly of the casing 1, upon a shaft 6, which is journalled in suitable bearings 7 and extends into said casing 1 as shown in Fig. 4. This obscuring disk 5 may be termed a movable indicator element and normally rests in the position shown in Figs. 2 and 4, so as to cover the face of the lamp. The disk 5 may be provided with a bull's eye 8 of red glass if the front 4 is of white glass or if the latter is of red glass the bull's eye may be omitted entirely from the opening in the obscuring disk. In the interior of the casing 1 the shaft 6 carries a grooved pulley 9 about which a flexible cable 10 extends, one end of said cable being fastened to a coil spring 11 which is attached to a fixed stud 12 and the other end of said cable being secured to a piston 13 mounted to reciprocate in a cylinder 14. The latter is located within the casing 1 and is in communication with a tube 15 which terminates exteriorly of said casing 1 in the form of a suitable coupling or nipple 16. The cylinder 14 is provided further with an air vent 17 as shown in dotted lines in Figs. 2 and 3.

A pipe 18 is connected at one end with the nipple 16 and at its other end with the intake manifold 19 between the carburetor 20 and the engine 21. At a suitable point, the pipe 18 is provided with a controlling valve whereby the actuation of the signal coincidentally with the operation of the brake-pedal or equivalent element is brought about. In order to insure a maximum of efficiency it is desirable that the controlling valve should possess the following characteristics: first a very slight depression of the brake pedal or a slight actuation of its equivalent, should open the valve fully; second, the valve once open, any further depression of the brake pedal or actuation of its equivalent should have absolutely no effect upon the valve opening; nor should it exert any mechanical strain upon the valve or upon the pipe in which the valve is located; third, the valve should always close easily and without hammering and should not tend to "overthrow" on closure so as to strain or jam the valve parts; fourth, the natural twisting, shaking and vibration of the parts necessarily consequent upon the operation of the vehicle should neither affect the open or closed position of the valve nor put any strain upon it. Thus, as shown in Figs. 5 and 6 the controlling valve may be a two-way valve 22 having a diametrical passage 23 and a transverse radial passage 24 communicating therewith. The valve casing is provided with a relief aperture 25, while the valve 22 is provided with a crank-arm 26 pivotally connected with a rigid stem 27 which is suitably connected with the brake-rod 28 or equivalent element, the brake-rod being connected in the usual manner with the brake lever 29 and the customary foot pedal 30. In the arrangement illustrated in Fig. 5 the stem 27 passes through an apertured head 31 which is located between a fixed collar 32 and a washer 33 on the stem 27, the latter at its free end being screw threaded for the accommodation of one or more nuts 34. A coil spring 35 is located upon said stem 27 between the washer 33 and nuts 34 against both of which it bears. The apertured head 31 comprises an integral part of a member 36 which in turn is carried by a clamping member 37. The latter, in combination with a co-operating clamping member 38, constitutes a clamp which is secured upon the brake rod 28 or its equivalent by means of clamp screws 39 as shown in Fig. 5.

Suitable stops 40 and 41, preferably adjustable, may be provided on the valve casing of the valve 22 to limit the movements of the crank-arm 26 in opposite directions for the purpose to be more fully described hereinafter.

In the normal condition of the parts, that is in the illustrated example, with the brake released the valve 22 occupies the position shown in Fig. 5 in which the diametrical passage 23 registers with the pipe 18 so that the connection between the cylinder 14 and the intake manifold 19 is uninterrupted. Assuming now that the engine 21 is in operation, the suction produced in the intake manifold 19 will be effective, through the pipe 18 and valve 22, in the cylinder 14 and upon the piston 13 therein, and as a result will draw the latter to the position shown in Fig. 2 and thereby exert a pull upon the cable 10 against the tension of the spring 11. By reason of the fact that the cable 10 passes about the pulley 9 the pull upon said cable will bring about a rotation of said pulley whereby the obscuring disk 5 is moved to its lower position in which it covers the lamp front 4, it being understood that at night the bull's eye 8 will show red in the customary manner with said disk in the position referred to. In other words, as long as the engine is running and the valve 22 is in the position shown in Fig. 5, the suction produced in the intake manifold, by acting upon the piston 13, will maintain the obscuring disk 5 in a position in which the signal "stop" is covered, the spring 11 being stretched or under tension in this position of the parts.

When it is desired to slow down or stop the vehicle, the driver will, besides cutting down his power, naturally actuate some element of the mechanism whereby these results are attained, for instance, in the illustrated example he will depress the foot-brake pedal 30 to operate the foot brake. This causes the brake-rod 28 to move forwardly in the direction of the arrow in Fig. 5 and by reason of its connection with the stem 27 causes a similar movement of the latter in the same direction whereby the crank-arm 26 is swung from the position shown in Fig. 5 to the position shown in Fig. 6. The swinging movement of the crank-arm 26 in this direction is arrested by the stop 41 and brings about a partial rotation of the valve 22 in its casing sufficient to move the passage 23 out of registry with the pipe 18 and into registry with the relief aperture 25, the passage 24 being coincidentally moved into registry with that section of the pipe 18 which extends between the valve 22 and cylinder 14. In other words the valve 22 is adjusted to the position shown in Fig. 6 in which communication between the cylinder 14 and the intake manifold 19 is cut off and the suction previously effective in said cylinder 14 is relieved by way of the tube 15, pipe 18, valve passages 24 and 23 and relief aperture 25. The piston 13 being thus relieved from the restraining effect of said suction and resistance to the action of the spring 11 consequently being no longer present, the latter, by contracting, will exert a pull, in the reverse direction upon the cable 10 which is communicated to the pulley 9 and thereby swings the obscuring disk 5 from the position shown in Fig. 2 to the position illustrated in Fig. 3. In this latter position of the disk 5 the word "Stop" is fully exposed and being plainly and contrastingly produced upon the lamp front is readily visible in the day time, the very movement of the obscuring disk serving to draw attention to the signal. At night the lamp in the casing 1 being lighted, the signal "Stop" will necessarily stand out very plainly.

It will be understood that a continued movement of the brake-rod 28 in the direction of the arrow in Fig. 5 after the movement of the valve 22 to the position shown in Fig. 6 will simply cause a compression of the spring 35 so that the valve and its connected parts will not be subjected to any undue strain.

As pressure upon the brake-pedal 30 or actuation of its equivalent ceases, the valve 22 will be returned to its normal position shown in Fig. 5, the movement in this direction being arrested by the engagement of the crank-arm 26 with the stop 40. The diametrical passage 23 being again in registry with the pipe 18 and communication being thereby again established between the cylinder 14 and the intake manifold 19, the suction produced in the latter will again become effective upon the piston 13 and will draw the latter downwardly in the cylinder 14 to the position shown in Fig. 2. This causes the cable 10 to be drawn against the tension of the spring 11 and thereby rotates the pulley 9 in a direction to return the obscuring disk 5 to its lower position in which it again covers the front of the lamp and the signal "Stop." During the reciprocating movements of the piston 13 air is drawn into and expelled from the cylinder 14 through the air vent 17 thus preventing the formation of a vacuum or an air cushion behind said piston whereby its movements would be interfered with.

In order to still further increase the efficiency of operation we have devised the special form of valve shown in Fig. 7 as a substitute for the valve 22 and which includes all of the advantageous characteristics hereinbefore set forth. As illustrated in Fig. 7 the construction comprises a casing 42 closed at one end by a preferably removable head 43 having a passage 44 which communicates with that section of the pipe 18 leading to the intake manifold 19. The casing itself is provided with a transverse passage 45 which communicates with that section of the pipe 18 leading to the cylinder 14, the two passages 44 and 45 being in communication with each other through the casing 42 when the controlling valve is open. At its opposite end the casing is formed with an outwardly projecting boss 46 having an axial passage in which the valve stem $22^a$ is slidable, said stem being provided with flattened portions $22^b$ or being otherwise constructed to provide one or more air passages 47 as shown in Fig. 8. At its inner end the axial passage is constructed with a seat 48 for the accommodation of the valve $22^c$ formed on a relatively enlarged neck $22^d$ carried by the stem $22^a$. A rod $22^e$ terminating in a needle valve $22^f$ projects in an axial direction from the neck $22^d$, said needle valve $22^f$ being arranged to control the passage 44. A coil-spring 49 surrounds the rod $22^e$ and bears with one end against the head 43 and with its other end against the neck $22^d$, the force exerted by said spring tending to maintain the valve $22^c$ upon its seat 48 and to return it thereto. The illustrated means for operating the valve comprises a lever $26^a$ pivoted at one end upon a lug 50 projecting from the boss 46, said lever extending through an opening 51 in the valve stem $22^a$ and having its other end connected with a stem $27^a$. In the arrangement illustrated in Fig. 7 the stem passes through a slidable sleeve $31^a$ and at its free end is provided with a fixed collar 34ª which may be screw-threaded upon said stem for adjustment purposes. A coil spring 35ª is located upon said stem 27ª between the sleeve 31ª and the collar 34ª against both of which it bears. The sleeve 31ª is embraced by and pivotally connected with a fork 36ª carried by a spindle 36ᵇ rotatable in a bearing 37ª forming part of a clamping member 37ᵇ. The latter in combination with a co-operating clamping member 38ª, constitutes a clamp which is secured upon the brake-rod 28 or its equivalent by means of clamp screws 39ª and a set screw 39ᵇ as shown in Fig. 7. It will be understood that the spring 35ª is stronger than the spring 49, the purpose of which will appear more fully hereinafter.

The rotatable spindle 36ᵇ, the pivotally connected sleeve 31ª, and the pivot whereby the stem 27ª is pivotally attached to the lever 26ª, together, serve as a universal joint whereby the brake rod 28 or its equivalent is connected with the valve. As a result of this arrangement, the brake rod 28 may be moved forward and backward by the brake pedal and may also move up and down and to one side or the other without bending or tending to bend or break any of the parts.

Normally the elements constituting the valve occupy the positions shown in Fig. 7 in which communication between the passages 44 and 45 and consequently between the pipe sections 18 is uninterrupted so that the suction which is produced in the intake manifold is effective upon the piston 13 which is thereby drawn to the position illustrated in Fig. 2 in which the obscuring disk is in its lower position in front of the signal.

When the brake pedal 30 is depressed or an equivalent element is operated to slow down the vehicle or bring it to a stop, the brake rod 28 or its equivalent will be actuated in a direction to exert a pull on the stem 27ª whereby the lever 26ª will be pivotally swung to the right in Fig. 7. This brings about an axial movement of the stem 22ª and moves the valve 22ᵉ away from the seat 48 and the needle valve 22ᶠ into the end of the passage 44, the spring 49 being compressed by these operations. As soon as the needle valve 22ᶠ reaches the end of the passage 44 any continued actuation of the brake pedal or its equivalent will simply compress the spring 35ª and thus have no straining effect upon the valve parts; as previously stated the spring 35ª is stronger than the spring 49 so that the initial pull on the stem 27ª will bring about a compression of said spring 49 by a shifting of the valve parts without materially compressing the spring 35ª.

As soon as the valve 22ᵉ is moved from its seat 48 and the valve 22ᶠ closes the passage 44, the effect of the suction produced in the intake manifold upon the piston will be removed so that the latter will be pulled back by the spring 11 and the obscuring disk 5 will be swung to the position shown in Fig. 3 in which the signal "Stop" is exposed. Any vacuum which may remain in that section of the pipe 18 which extends between the casing 42 and the cylinder 14 and in the latter, after the valves 22ᵉ and 22ᶠ have been operated as described, will be quickly relieved by the air which flows through the passages 47 along the stem 22ª. As soon as the brake pedal or its equivalent is released the parts will be returned to the position illustrated in Fig. 7 in which communication between the cylinder 14 and the intake manifold is again established. As a result the suction produced in the latter will again become effective in said cylinder 14 and upon the piston 13 therein and will thus bring about a return movement of the obscuring disk 5 to its lower position in which it again covers the signal.

In the form shown in Figs. 9 to 12 inclusive, the signal lamp 1ª may be of any usual construction, although, preferably, it should be of somewhat more than usual diameter. It is mounted upon a bracket, 2ª provided with a carrier bar 3ª, upon which the usual license plate 3ᵇ may be hung in the usual manner, a celluloid window 1ᵇ being provided at the bottom of the lamp for illuminating said license plate.

The bracket 2ª is shaped so as to provide a cylinder 14ª, in which is housed a slidable piston 13ª, of usual cup ring construction having a piston rod 13ᵇ pivotally connected with the slotted end of a crank arm 10ª which is itself pivotally attached by a shaft 6ª, to an arm which projects laterally from the bracket.

In this form also the glass front 4ª of the lamp may be of red glass, as usual, or of white glass, and has the word "Stop" painted or otherwise formed thereupon in a color contrasting with that of the front itself.

An obscuring disk 5ª is provided with an arm, the outer end of which is fixedly attached to the shaft 6ª, upon which is fixed the arm 10ª. This obscuring disk ordinarily rests in the position shown in Figs. 9, 11 and 12 so as to cover the face of the lamp. It is provided with a central bull's eye 8ª, of red glass if the lamp part is of white glass; if the lamp part is of red glass the bull's eye may be omitted altogether from the opening in the obscuring disk.

The end of the cylinder 14ª opposite the piston rod 13ᵇ is bored to receive a pipe 18ª whose other end is tapped into the intake manifold 19, between the carburetor 20 and the engine 21 as in the form first described.

Pipe 18ª is provided with a valve, 22ᵍ which may be of usual construction or which may be of the two-way type as shown in Figs. 14 and 15, said valve 22ᵍ having a crank arm 26ᵇ pivotally connected by a rigid stem 27ᵇ to a member 36 which may be fixed upon the brake rod 28 or its equivalent in the manner previously described with respect to Fig. 5.

In this form of our invention the suction which is produced in the intake manifold is normally ineffective in the cylinder 14ᵃ because the valve 22ᵍ occupies the position shown in Fig. 14 in which the diametrical passage 23ᵃ is out of registry with the pipe 18ᵃ and communication between the cylinder 14ᵃ and the intake manifold 19 is thus cut off. The obscuring disk 5ᵃ, by its own weight, thus lies in its lower position and covers the signal, the bull's eye 8ᵃ showing red at night in the usual way.

The operation of the form of our invention now being described is as follows:

When it is desired to slow or stop the car, the driver, as before, will, besides cutting down his power, naturally depress the foot brake 30. This will cause the valve 22ᵍ to be rotated through the movement of brake rod 28 and brings the diametrical passage 23ᵃ into registry with the pipe 18ᵃ as shown in Fig. 15, thus opening cylinder 14ᵃ, through pipe 18ᵃ to the suction produced in the intake manifold. Piston 13ᵃ will therefore be forced inwardly, thus raising the obscuring disk and exposing the word "Stop" upon the lamp front. During the day this word "Stop" being plainly and contrastingly printed, will readily be seen, while at night the lamp being lighted, the word will necessarily stand out very plainly.

When the foot brake 30 or its equivalent is released the valve 22ᵍ will be returned to the position shown in Fig. 14 in which communication between the intake manifold and the cylinder 14ᵃ is again cut off. The result of this is that the obscuring disk 5ᵃ will drop back in front of the signal by gravity, any vacuum which remains in the pipe 18ᵃ between the valve casing and the cylinder 14ᵃ being relieved by the air which flows through the relief aperture 25ᵃ, passage 23ᵃ, transverse passage 24ᵃ and pipe 18ᵃ.

In cases where the two-way valve of Figs. 14 and 15 is not desired and the type of valve shown in Fig. 7 is preferred, the valve arrangement illustrated in Fig. 13 may be substituted in the form of our invention now being described.

This valve is of the same general construction as that shown in Fig. 7 and differs therefrom only in operation. In the present instance the needle valve 22ʰ by the action of the spring 49ᵃ is maintained normally against the end of the passage 44ᵃ to close the same, while the valve 22ⁱ is away from its seat 48ᵃ. The result is that communication between the two sections of pipe 18ᵇ and consequently between the intake manifold 19 and the cylinder 14ᵃ is normally cut off.

As the brake rod or its equivalent is actuated the lever 26ᵇ will be operated through the medium, for instance, of cable 27ᶜ, 27ᵈ connected respectively with the lever 26ᵇ, the brake rod 28 and with an interposed spring 35ᵇ and will move the needle valve 22ʰ away from the passage 44ᵃ against the tension of the spring 49ᵃ and at the same time will seat the valve 22ⁱ upon its seat 48ᵃ. A free and practically unrestricted passage is immediately provided between the intake manifold and the cylinder 14ᵃ whereby the suction by acting upon the piston 13ᵃ swings the obscuring disk 5ᵃ to its raised position and thus exposes the signal "Stop". As soon as the brake pedal or its equivalent is released the needle valve 22ʰ will be moved back to again close the passage 44ᵃ and the valve 22ⁱ will be moved away from its seat 48ᵃ thereby cutting off the suction from the cylinder 14ᵃ and permitting the obscuring disk 5ᵃ to return to its lower position by gravity and to again cover the signal; whatever vacuum may remain between the piston and the valve is instantly relieved by the air which enters the channels 47ᵃ along the stem 22ⁱ in the same way as in the form shown in Fig. 7. It will be understood that the spring 35ᵇ being stronger than the spring 49ᵃ the initial pull on the cables 27ᶜ, 27ᵈ will have substantially no effect thereon; said spring 35ᵇ serving as a take-up in the same way as do the springs 35 and 35ᵃ of Figs. 5 and 7 respectively.

We have shown the invention as applied to a "Stop" signal only, this being sufficient to illustrate the novel principle which we have utilized, namely, the control of the signal by means of the suction produced in the intake manifold. It will be clear, however, to those skilled in the art, that the same principle may be applied to the operation of a right and left signal, and, furthermore, that the principle may be so utilized as to provide for both a stop signal and right and left signals in the same device, any one of such signals being made according to the need at the time.

Various changes in the specific forms shown and described may be made within the scope of the claims without departing from the spirit of our invention.

We claim:

1. In an automobile, a signal comprising a cylinder, a piston movable therein, an indicator element operatively connected with the piston, a pipe connecting the cylinder with the intake manifold and means for automatically opening or closing the passage through said pipe concurrently with the operation of the brake and in accordance with the position thereof.

2. In an automobile, a signal comprising a cylinder, a piston movable therein, an indicator element operatively connected with the piston, a pipe connecting the cylinder with the intake manifold, a valve for opening and closing the passage in said pipe and a link connecting said valve with the brake lever, whereby said valve is operated concurrently with the brake and in accordance with the position thereof.

3. In an automobile, a signal comprising an indicator element movably mounted upon the car, a cylinder also mounted upon the car, a piston movable in the cylinder and operatively connected with the indicator element, a pipe connecting the cylinder with the intake manifold, a valve in said pipe and a link connecting said valve with the brake pedal whereby actuation of the brake operates the valve and, hence, causes the piston to move so as to operate the indicator element coincidentally and in accordance with the brake.

4. In combination, in an automobile signal, a pipe extending from a suction source to an indicator element with which it is operatively connected, a valve in said pipe, and a universal joint connecting said valve with the brake pedal rod whereby said valve is operated in harmony and coincidentally with the brake.

5. In combination in an automobile signal, a pipe extending from a suction source to an indicator element with which it is operatively connected, a needle valve in said pipe, and a universal joint connecting said valve with the brake pedal rod whereby said valve is operated in harmony and coincidentally with the brake.

6. In combination in an automobile signal, a pipe extending from a suction source to an indicator element with which it is operatively connected, a valve in said pipe, a spring tending to keep said valve in its normal position, a brake pedal and a universal joint connecting valve and pedal, the joint actuating the valve for one direction of movement of the pedal and being movable relatively to said valve for the other direction of movement.

7. In combination in an automobile signal, a pipe extending from a suction source to an indicator element with which it is operatively connected, a needle valve in said pipe, a spring for keeping said valve in its normal position, a connection slidably attached to the needle valve and secured to the brake pedal rod, and a compression spring connected with the needle valve and adapted to be engaged by said slidable connection when the brake pedal is depressed, the compression spring being stronger than the first mentioned spring.

8. In combination in an automobile signal, a pipe extending from a suction source to an indicator element with which it is operatively connected, a needle valve in said pipe, a spring for maintaining said valve in its normal position, a slidable collar upon the needle valve connected with the brake pedal, and a compression spring connected with the needle valve, said spring being stronger than the first mentioned spring and its inner end being disconnected from but adapted to be engaged by a slidable collar when the brake pedal is depressed.

9. The combination with a vehicle, of a motor for propelling the same, a movable indicator element mounted on the vehicle, a suction responsive device operated by the suction of the motor to maintain said indicator element in one position, means whereby said indicator element is moved to another position, and means controlled by the driver whereby the suction connection is opened and closed to cause said suction responsive device to actuate said indicator element or to release said suction-responsive device and permit said first-named means to operate said indicator element.

10. The combination with a vehicle, of a motor for propelling the same, a signal, an indicator element adapted to cover and uncover said signal, a suction responsive device operated by the suction of the engine to maintain said element in a position to cover said signal, a spring operatively connected with said suction responsive device whereby said element is moved to a position to uncover said signal and means controlled by the driver whereby said suction responsive device and said spring are selectively caused to actuate said indicator element.

11. The combination of a signal, an indicator element arranged to cover and uncover said signal, a connection therefrom to a source of suction, a valve in said connection normally providing free communication between said source of suction and said element whereby the latter is maintained in its normal position to cover said signal by suction and means controlled by the driver for actuating said valve to cut off the suction from said element whereby the latter is moved from its normal position to a position in which said signal is uncovered.

12. The combination of a signal, an indicator element arranged to cover and uncover said signal, a shaft carrying said indicator element, a cylinder, a piston movable therein and operatively connected with said shaft to rock the same in one direction, a connection from said cylinder to a source of suction, a valve in said connection normally providing free communication between said source of suction and cylinder whereby said piston is actuated by said suction to move said indicator element to its normal position to cover said signal and to maintain it therein, means controlled by the driver for actuating said valve to cut off the suction from said cylinder and a spring operatively connected with said shaft whereby the latter is rocked in the opposite direction to move said indicator element to uncover said signal when said suction is cut off.

In testimony whereof we have hereunto set our hands.

HARRY J. STOCKUM.
JOSIAH HOWARD VAN SCIVER.